J. D. WEAVER.
HYDRAULIC RAM.
APPLICATION FILED JUNE 19, 1911.
1,026,890.
Patented May 21, 1912.
2 SHEETS—SHEET 1.
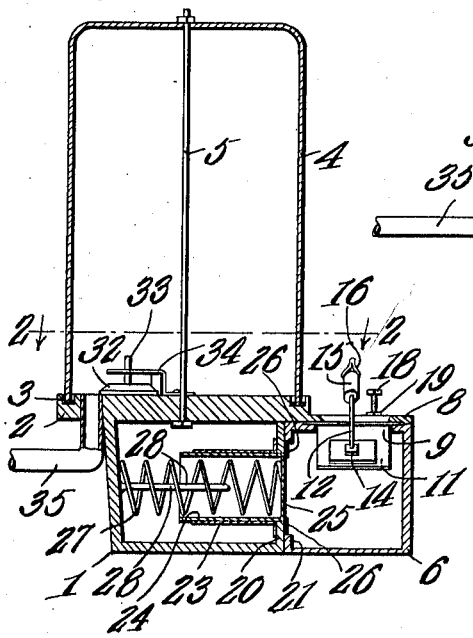
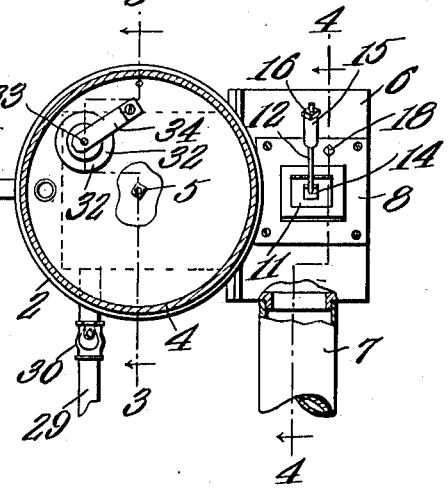
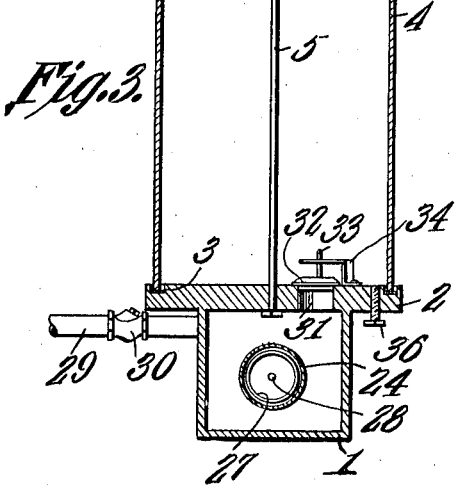
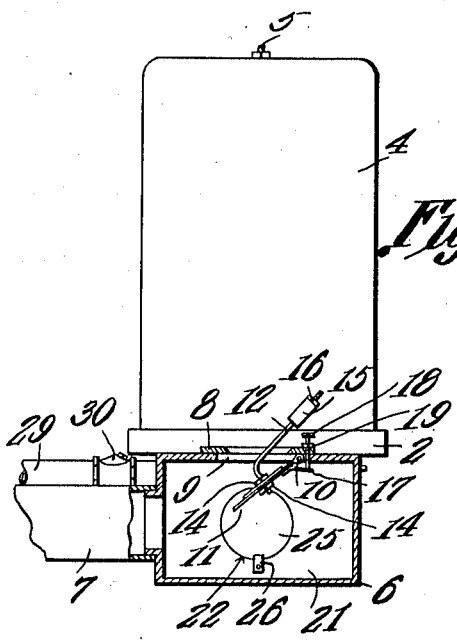
Witnesses
John D. Weaver, Inventor
by C. A. Snow & Co.
Attorneys

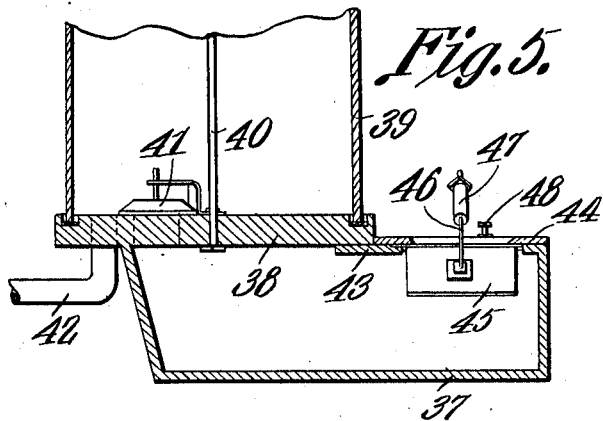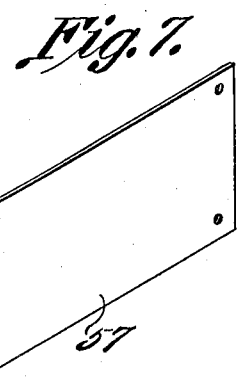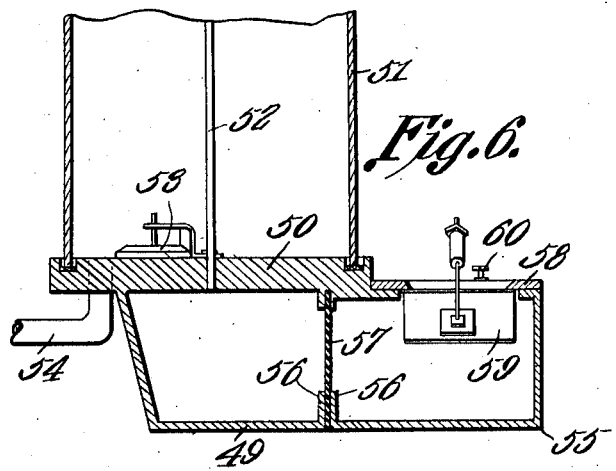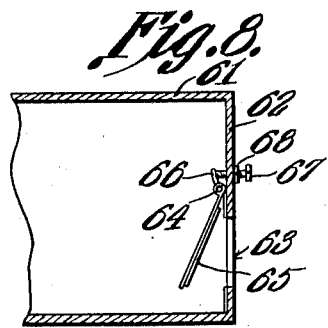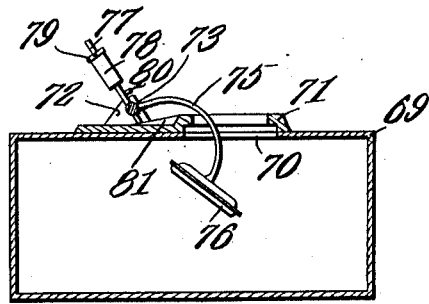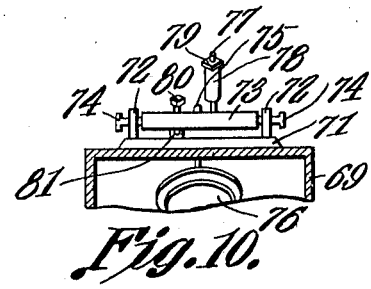

UNITED STATES PATENT OFFICE.

JOHN D. WEAVER, OF MIFFLINBURG, PENNSYLVANIA.

HYDRAULIC RAM.

1,026,890.  Specification of Letters Patent.  Patented May 21, 1912.

Application filed June 19, 1911. Serial No. 634,029.

*To all whom it may concern:*

Be it known that I, JOHN D. WEAVER, a citizen of the United States, residing at Mifflinburg, in the county of Union and State of Pennsylvania, have invented a new and useful Hydraulic Ram, of which the following is a specification.

The objects of the present invention are, to provide a novel form of hydraulic ram, in which, when desired, an actuating source of water supply may be employed, for elevating another, independent body of water.

A further object of the invention is to provide a novel form of yieldable structure, adapted to be interposed between the main and supplemental casings, whereby the actuating source of water, entering the supplemental casing, will be made effective to force into the air chamber, an independent body of water located in the main casing.

A further object of the invention is to provide a novel form of closure valve, for checking the flow of the actuating body of water.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 shows one form of the invention in vertical longitudinal section; Fig. 2 is a transverse section upon the line 2—2 of Fig. 1; Fig. 3 is a section on the line 3—3 of Fig. 2; Fig. 4 is a view partly in section on the line 4—4 of Fig. 2; Fig. 5 is a fragmental vertical section showing a modified form of the invention; Fig. 6 is a fragmental vertical section showing a still further modification; Fig. 7 is a perspective of the diaphragm employed, in connection with that form of invention shown in Fig. 6; Fig. 8 is a fragmental vertical section, showing a modified form of check valve; Fig. 9 is a fragmental vertical section, showing a further modification in the check valve; and Fig. 10 is a fragmental section, at right angles to the cutting plane of Fig. 9, and the view depicting the structure appearing in Fig. 9.

Referring to Figs. 1, 2, 3, and 4, the body of the ram consists of a main casing 1, provided with a top plate 2, grooved in its upper surface, as shown at 3, to receive the lower edge of the air chamber 4, the same being held in place by a bolt 5 or the like, extended downwardly through the top of the air chamber, to engage with the top plate 2. The invention further includes a supplemental casing 6, secured to one side of the main casing 1. The actuating body of water enters the supplemental casing 6 by way of a supply pipe 7. The upper portion of the supplemental casing 6 is provided with an opening 9, overhung by an open frame 8, to which is pivoted, as shown at 10, an outwardly closing valve 11, adapted to seat, within the opening 9, against the frame 8. The valve 11 is provided with a curved arm 12, extended upwardly and laterally, through the frame 8, the valve 11 being held in place upon the arm 12 by means of nuts 14 or the like. Threaded upon the outer end of the arms 12, is a weight 15, the weight being held in place by a jam nut 16. The weight tends to aid in closing the valve 11, and is a useful, but not absolutely necessary element. The valve 11 is equipped, below its pivotal mounting 10, with a protruding finger 17, adapted to be engaged by an adjusting member, preferably taking the form of a screw 18, threaded through the frame 8, and held in place by a jam nut 19. The adjusting screw 18 serves to limit the movement of the valve 11, when the same drops into an open position, and, as will be readily understood, the downward travel of the valve 11 may be adjusted, by rotating the adjusting screw 18. In the adjacent side walls 20 and 21 of the main casing 1 and of the supplemental casing 6, there are openings 22. Secured to the inner face of the wall 20, about the opening therein, is a tube 23, protruding into the main casing 1. Slidably mounted in the tube 23, is a cap 24, closed at one end, as shown at 25. There are stops upon the wall 21 of the supplemental casing 6, which stops serve to limit the movement of the tube 23 in one direction, under the actuation of a spring 27, one end of which bears against the wall 25 of the cap 24, the other end of the spring 27 bearing against one wall of the main casing 1. Located within the spring 27, and connected to the end wall of the casing 1, so as to project within the cap 24, is a pin 28, adapted to engage the end 25 of the tube 24, to limit the movement of the cap 24, when the cap 24 is slid in the tube 23, under the pressure of the water in the supplemental casing 6.

Water from a pure source of supply, independent from the source of supply to the casing 6, is supplied to the casing 1, by means of a pipe 29, provided with a suitable check valve 30, preventing the water from flowing rearwardly toward the spring or other source of pure supply. In the top plate 2 of the casing 1, there is an opening 31, closed by a gravitationally moving valve 32, having a stem 33, slidable in an angle bracket 34, secured to the upper face of the top plate 2, and overhanging the opening 31 therein. Water will find its way out of the air chamber 4, through an outlet pipe 35, extended downwardly through the top plate 2. The air chamber 4 may be drained, without disconnecting the air chamber from the top plate 2, through the instrumentality of a drain plug 36, preferably threaded into the top plate 2.

The operation of the device as hereinbefore described, is as follows. The water, from the actuating source, passing through the supply pipe 7, will enter the supplemental casing 6, causing a closing of the valve 11. The flowing water supply will thus be arrested, and pressure will be imparted against the closed end 25 of the cap 24, the cap 24 sliding within the tube 23, and compressing the spring 27. The main casing 1 is normally filled by the pure supply, provided through the pipe 29. When the cap 24 moves, as hereinbefore described, the contents of the casing 1 will be displaced, causing the pure supply to raise the valve 32, and enter the air chamber 4, the valve 32 automatically closing, when the pressure within the main casing 1 falls sufficiently. Obviously, the contents of the air chamber 4 will be projected through the outlet 5. The spring 27 will be employed to effect a closing of the slidable cap 24, only when the head supplied to the main casing 24, through the pipe 29, is insufficient.

Referring to the form of invention shown in Fig. 5, the body of the ram includes a main casing 37, having a top plate 38, carrying the air chamber 39, retained by the bolt 40, the flow of water into the air chamber 39 being controlled by the valve 41, hereinbefore described, the water flowing out of the air chamber 39 by the outlet pipe 42. The main casing 37 is provided with an extended top 43, having an opening overhung by the frame 44, equipped with a pivoted valve 45, carrying a stem 46, provided with a counterweight 47, the tilting of the valve 45 being regulated by the adjusting screw 48, the general construction differing but slightly from the construction hereinbefore described in connection with that form of the invention disclosed in Fig. 1.

In that form of the invention depicted in Fig. 5, the water supply, entering the casing 37, will close the valve 45, the flow of the water being arrested, the water raising the valve 41, and entering the air chamber 39, the valve 41 closing, and the water passing out of the pipe 42; it being understood, that, in the form of the invention shown in Fig. 5, a single body of water is arrested, and forced into and out of the air chamber 39.

In that form of the invention shown in Fig. 6, the main casing is denoted by the numeral 49, the main casing having a top plate 50, carrying the air chamber 51, retained by the bolt 52, the valve 53 serving to control the flow from the main casing 49 into the air chamber 51, as hereinbefore described, the numeral 54 referring to the outlet pipe whereby the contents of the air chamber is delivered. Applied to one side of the main casing 49, is a supplemental casing 55, the adjacent walls 56 of the casings 55 and 49 having openings, bridged by a yieldable diaphragm 57, preferably formed from rubber or the like, the diaphragm being bound between the walls 56. In the top of the supplemental casing 55, there is an opening, overhung by a frame 58, to which is pivoted a valve 59, outwardly closing, the tilting of the valve being limited by the adjusting screws 60, in the manner hereinbefore described.

The operation of the device shown in Fig. 6 need be described but briefly, it being understood that the actuating stream of water, entering the supplemental casing 55, will actuate the diaphragm 57, and displace the water within the main casing 41, the independent body of water in the main casing 49 flowing into the air chamber 51, as will be readily understood.

In that form of the invention shown in Fig. 8, the supplemental casing is denoted by the numeral 61, the casing 61 corresponding to the casing 55 of Fig. 6. In one end wall 62 of the casing 61, there is an opening 63, a valve 65 being pivotally connected, as shown at 64, with the end wall 62, to close the opening 63, to check the flow of the actuating body of water, the valve 65 being equipped with an extending finger 66, adapted to bear against the inner end of a screw 67, threaded into the wall 62, and held in place by a jam nut 68, the operation resembling, in all practical points, the coöperation between the screw 18 and the finger 17, as shown in Fig. 4.

In that form of the invention shown in Figs. 9 and 10, the supplemental casing is denoted by the numeral 69, the same having an opening in its upper portion, shown at 70, the opening being overhung by a frame 71, having ears 72, between which is located the shaft 73, rotatably held in bearing screws 74, mounted in the ears 72. The shaft 73 carries a curved arm or stem 75, extended downwardly through the opening 70 in the top of the casing 69, the stem 75 carrying at its lower end a valve 76, serving to check the flow of the actuating body of water. The cap 73 is provided with a radial arm 77, upon which is threaded a weight 78, carried by a jam nut 79. Threaded into the shaft 73 is an adjusting member, preferably taking the form of a screw 80, adapted to engage with an inclined lug 81 formed upon the frame 21, the adjusting screw 80 coöperating with the lug 81 in limiting the movement of the valve 76, when the same drops into open position.

Having thus described the invention, what is claimed is:—

In a device of the class described, a body provided with an opening; an air chamber communicating with the body; a valve located within the body and pivoted to the body, to serve as a closure for the opening, the valve being provided with a rearwardly extended finger; a screw threaded through the body and adapted to engage the finger, to limit the movement of the valve into open position; an arm secured to the valve and curved rearwardly toward the pivotal mounting of the valve, the arm being extended through the opening; a weight movably mounted upon the arm; and means for holding the weight against movement upon the arm.

In testimony that I claim the foregoing as my own, I have hereto affixed my signature in the presence of two witnesses.

JOHN D. WEAVER.

Witnesses:
Geo. F. Guyer,
M. T. Wiest.

---

Copies of this patent may be obtained for five cents each, by addressing the "Commissioner of Patents, Washington, D. C."